No. 746,592. PATENTED DEC. 8, 1903.
D. J. SIGFRIDSON.
COMBINED CORN AND POTATO PLANTER.
APPLICATION FILED JULY 17, 1903.
NO MODEL. 2 SHEETS—SHEET 2.

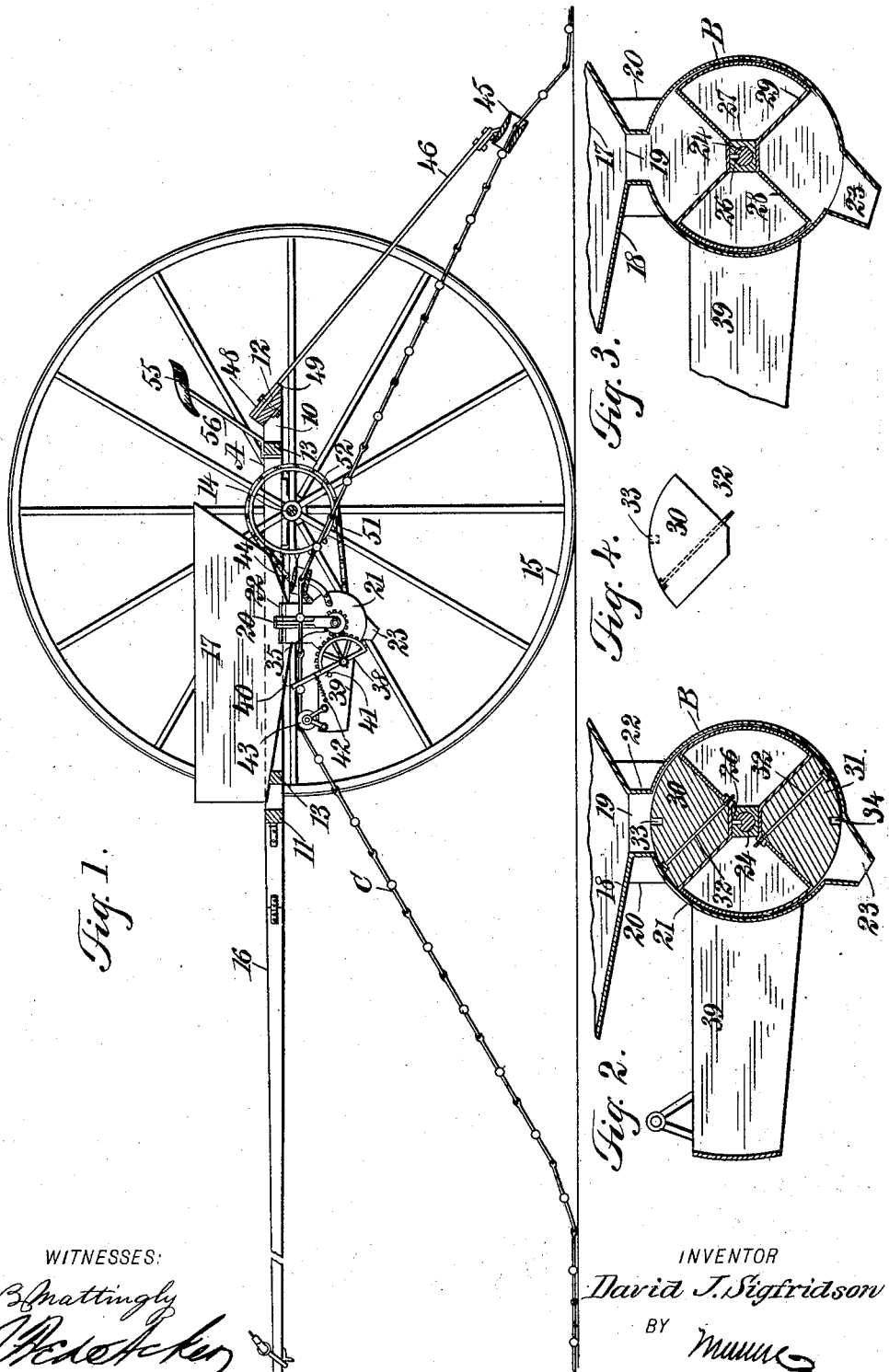

WITNESSES:

INVENTOR
David J. Sigfridson
BY
ATTORNEYS.

No. 746,592. Patented December 8, 1903.

UNITED STATES PATENT OFFICE.

DAVID J. SIGFRIDSON, OF ISANTI, MINNESOTA.

COMBINED CORN AND POTATO PLANTER.

SPECIFICATION forming part of Letters Patent No. 746,592, dated December 8, 1903.

Application filed July 17, 1903. Serial No. 165,962. (No model.)

*To all whom it may concern:*

Be it known that I, DAVID J. SIGFRIDSON, a citizen of the United States, and a resident of Isanti, in the county of Isanti and State of Minnesota, have invented a new and Improved Combined Corn and Potato Planter, of which the following is a full, clear, and exact description.

The purpose of the invention is to provide an agricultural implement adapted for planting large and small seed, especially potatoes and corn, the dropping mechanism being operated either through the medium of the check-row chain or wire or from the axle of the machine, according to whether the seed is to be planted in hills or in drills.

A further purpose of the invention is to provide a simple, economic, durable, and effective planting mechanism capable of being adjusted to meet the requirements of any work in hand.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 5:
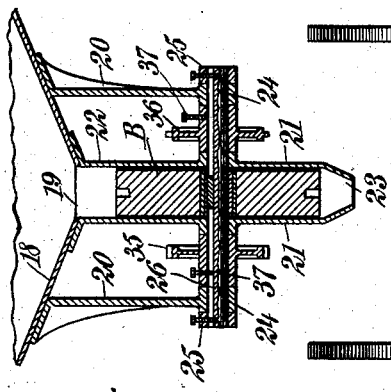
Figure 7:
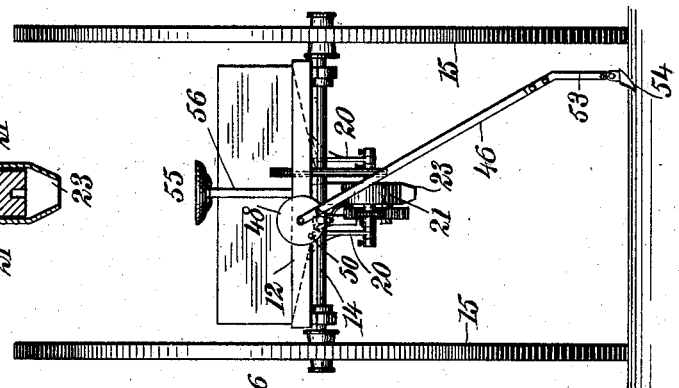
Figure 6:
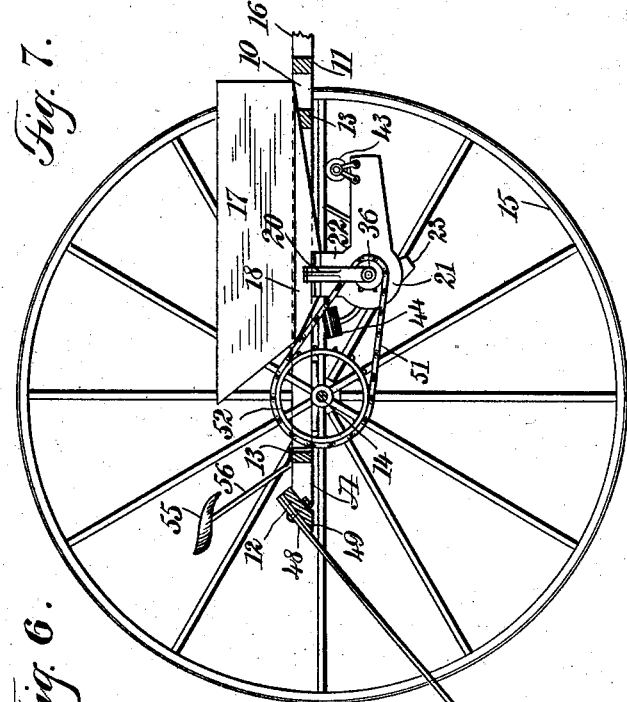

Figure 1 is a longitudinal section through the frame and axle of the machine, the seed-dropping mechanism being shown in side elevation and fitted for operation through the medium of the check-row chain or wire. Fig. 2 is a vertical section through the seed-dropping device of the seed-dropping mechanism and the casing in which the device revolves, the dropping device being shown as arranged to receive and drop small seed, such as corn. Fig. 3 is a view similar to Fig. 2, with the exception that the dropping device is shown arranged for large seed, such as potatoes. Fig. 4 is a detail view of one of the blocks of the dropping device removed from the body of the device. Fig. 5 is a section through the seed-dropping mechanism, taken at right angles to the sections shown in Figs. 2 and 3, and a section through the bearings for the shaft of the dropping device and through the driving-gear on the shaft, the shaft appearing in side elevation. Fig. 6 is a vertical longitudinal section through the frame of the machine and the axle, showing the operation of the parts when the machine is used as a drill-planter; and Fig. 7 is a rear elevation of the machine when arranged as shown in Fig. 6.

The frame A of the machine may be of any desired construction. As shown, however, it consists of parallel side beams 10, a front connecting beam or bar 11, a rear connecting beam or bar 12, having a downward and rearward inclination, and intermediate cross-beams 13. The axle 14 is journaled, preferably, at the rear of the center of the frame in suitable bearings carried thereby, as is shown in Figs. 1, 6, and 7, and the axle is provided at each end with a supporting-wheel 15, one of the wheels being preferably secured to the axle and the other having ratchet connection therewith, as is customary in this class of machines. The frame is completed by the addition of a tongue or pole 16.

A hopper 17, having an inclined or sloping bottom 18, is suitably supported in the frame A, extending usually from a point near the front to a point near the axle 14, and at the lowest point in the inclined bottom of the hopper 17 an outlet-opening 19 is produced. At each side of this opening a hanger 20 extends downward from the hopper, as is best shown in Fig. 5, and just below the outlet-opening 19 of the hopper 17 a cylindrical casing 21 is located, having a neck 22 at its upper portion connected with the hopper around the opening 19, and in the bottom portion of this casing an outlet-spout 23 is formed, through which the seeds pass out from the machine to the ground. This spout may be made as long as desired or another spout may be attached thereto, and the spout 23 is preferably given a downward and forward inclination.

The seed-drop device B of the seed-drop mechanism is of cylindrical form and comprises a body-section and removable sections, the body-section being made, preferably, of metal and the removable sections of wood, if so desired. The body-section comprises a hub 27, which is secured to the central portion of a shaft 24, journaled in suitable boxes at the lower ends of the hangers 20 and opposing segmental members 28 and 29, each member representing a quarter of a circle. The ends of the shaft are provided with attached collars 25 to hold the shaft from slipping endwise, and in the said shaft longitudinal grooves 26 are produced at each side of the center for a purpose to be hereinafter described. The removable members or sections 30 and 31 of the seed-dropping device B are adapted to neatly fit in the spaces between the members 28 and 29 of the body-section, as is illustrated in Fig. 2, thus completing the true cylindrical form of the seed-dropping device.

The removable sections or members 30 and 31 of the seed-dropping device B are attached to the body members 28 and 29 by means of suitable bolts 32 or their equivalents, and in the peripheral or outer edge of the removable members 30 and 31 of the said seed-dropping device pockets 33 and 34 are respectively formed, adapted to hold small seed, corn, for example, in desired quantities.

A gear-wheel 35 is mounted to turn on the shaft 24 at one side of the center of said shaft, and a sprocket-wheel 36 is mounted to turn on the said shaft at the opposite side of its center. The hubs of the gear and the said sprocket-wheel are provided with set-screws 37, adapted to enter the grooves 26 in the said shaft whenever one of the wheels is to be secured to and is to turn with the shaft. When one of the said wheels is thus secured, the other wheel is loose on the shaft.

A segmental gear 38 is mounted to turn upon a forward extension 39 from the casing 21 of the seed-dropping mechanism, and the teeth of the segmental gear mesh with the teeth of the gear-wheel 35, as is shown in Fig. 1. This segmental gear is to have a rocking motion, so that at each movement it will revolve the seed-dropping device or the cylinder B a half of a revolution. This is accomplished through the medium of a check-row chain or wire C, provided with the usual projections, and the said projections on the wire or chain as the machine advances are brought in engagement with a trigger 40, which extends upward from the forward portion of the segmental gear 38, as is shown in Fig. 1, the forward movement of the said gear and the trigger being limited by a stop-pin 41. A spring 42 is attached to an extension 39 from the casing 21 and to the trigger 40, normally holding the said trigger in the forward position. (Shown in Fig. 1.) As the machine advances, the ends of the chain or wire C being anchored in the usual way, each knob or projection on the chain or wire as it is brought in engagement with the trigger 40 carries the trigger rearward, thus rocking the segmental gear 38, causing the seed-drop device B to turn a quarter of a revolution to bring, for example, the upper pocket 33, containing the seed, to a lower position, enabling the seed to drop out through the spout 23. When the projection on the chain or wire has passed the trigger 40, the spring 42 acts to restore the trigger to its normal position, causing the said seed-dropping device to be rocked back to its normal position. In this manner the seed is dropped at equal distances apart, the distance at which the seed will be spaced in dropping being regulated, as is customary, by the distance between the projections on the chain or wire. When the chain or wire C is used, both of the removable members 30 and 31 are secured to the body of the said device B, and the lower pocket 34 is closed by a removable plug.

The chain or wire C is made to pass over a guide-pulley 43, usually located at the forward end of the extension 39 from the casing 21, and the said chain or wire then passes rearward through a guide-sleeve 44, supported at the rear of the said casing 21, and finally the chain or wire C passes out through a second guide-sleeve 45, removably attached to an arm 46, extending downward from the central rear portion of the frame of the machine. These guide-sleeves 44 45 are preferably enlarged at their ends, so as to permit the ready entrance and exit of the projections on the wire or chain.

The arm 46 at the rear of the frame of the machine is given a downward and a rearward inclination and is adjustable on the said frame, being attached at its upper end to a disk 48, mounted to turn on a second disk 49, secured to the inclined cross-bar 12 of the frame of the machine, and the disk 48 is provided with a pin 50, (shown in Fig. 7,) adapted to enter any one of a series of apertures in the fixed disk 49, thus enabling the chain to be adjusted laterally when desired, and a marker to be adjusted laterally, which marker is used when the chain C is omitted and the machine is used for drill-planting, thus enabling the operator to mark a second row or the next to be planted as far as may be desired from the adjoining or planted row.

When potatoes are to be planted and the chain C is used, the upper member 30 of the seed-dropping device B is removed, and when the chain is omitted both of the members 30 and 31 are removed, and if under the same conditions small seed, such as corn, is to be planted both of the pockets 33 and 34 are left open, since at such time the seed-dropping device B is given a constant rotary movement. This is accomplished by causing the gear 35 to run loose on the shaft 24 and fastening the sprocket-wheel 36 to the said shaft. A chain 51 is then passed over the sprocket-wheel 36 and over a larger sprocket-wheel 52, secured to the axle or to the inner hub of one of the supporting-wheels, as is shown in Figs. 6 and 7. When the machine is thus driven direct from the axle or from a supporting-wheel, the rear guide-sleeve 45 is disconnected from the arm 46 and an angular shank 53 is attached. At the lower end of the said shank a shoe 54 is located, adapted to trail on the ground, and thus produce a line on which the seed is to be planted at the next trip of the machine.

A seat 55 is provided for the driver, supported on the frame of the machine by a suitable standard 56.

Having thus described my invention, I claim as new and desire to secure by Letters Patent—

1. In a planter, a seed-dropping mechanism, comprising a casing, a cylindrical seed-dropping device mounted to turn in the casing, said seed-dropping device comprising a body-section consisting of two opposing segmental sections connected with each other by a hub, and segmental removable sections adapted to fit between the segmental connected sections, the removable sections being provided with pockets for the purpose described.

2. In a planter, a seed-dropping mechanism comprising a casing having an inlet and an outlet, and a cylindrical seed-dropping device mounted to turn in the casing and constructed of a series of segmental members sundry of which are rigidly connected to a hub, the remaining members being removable, as and for the purpose described.

3. In a planter, a seed-dropping mechanism comprising a casing having an inlet and an outlet, and a cylindrical seed-dropping device mounted to turn in the casing and constructed of four segmental members, two of said members being rigidly connected together by a central hub and the two remaining members being removable, the removable members having pockets therein, being adapted normally as upper and lower members, and means substantially as described, for securing the removable members to the fixed members, for the purpose set forth.

4. In a planter, a hopper, a casing located below the hopper and having an inlet and an outlet, the inlet communicating with the outlet of the hopper, a shaft extending through the casing, hangers extending downward from the hopper at each side of the casing and provided with boxes at their lower ends in which the said shaft is journaled, a seed-dropping device mounted to revolve in the casing, and comprising opposing segmental sections secured to the shaft, and removable segmental sections adapted to fit in the spaces between the members attached to the shaft, the removable members being provided with pockets, and means substantially as described for operating the said shaft, for the purpose described.

5. In a planter, a casing having an inlet and an outlet, a shaft extending through the casing, a seed-dropping device mounted to revolve in the casing, and comprising opposing segmental sections secured to the shaft and removable segmental sections adapted to fit in the spaces between the members attached to the shaft, the removable members being provided with pockets, a gear carried by the said shaft, a segmental gear adapted to mesh with the gear on the shaft, a support for the segmental gear, a stop limiting the movement of the segmental gear in one direction, a spring normally holding the segmental gear against such stop, and a trigger extending from the said segmental gear.

6. In a planter, a casing having an inlet and an outlet, a shaft extending through the casing, a seed-dropping device mounted to revolve in the casing, and comprising opposing segmental sections secured to the shaft, and removable segmental sections adapted to fit in the spaces between the members attached to the shaft, the removable members being provided with pockets, a gear carried by the said shaft, a segmental gear adapted to mesh with the gear on the shaft, a support for the segmental gear, a stop limiting the movement of the segmental gear in one direction, a spring normally holding the segmental gear against such stop, a trigger extending from the said segmental gear, a wheeled support for the said casing, an arm adjustably attached to the said frame at the rear, a guide carried by the said arm, a second guide carried by the said casing, a chain passed through the said guides, having projections thereon, which projections are adapted for engagement with the said trigger, and a support for the chain, located in front of the said trigger, all arranged for the purpose set forth.

7. In a planter, a hopper, a casing communicating at its upper portion with the hopper and having an outlet at its lower portion, a grooved shaft extending through the casing, hangers extending downward from the hopper at each side of the casing and carrying boxes in which the shaft is journaled, a seed-dropping device carried by said shaft and arranged to turn in the casing, a gear mounted to turn on the shaft, the hub of the gear being provided with a set-screw adapted to enter the groove in the shaft to secure the gear to said shaft, and means for turning the gear, as set forth.

In testimony whereof I have signed my name to this specification in the presence of two subscribing witnesses.

DAVID J. SIGFRIDSON.

Witnesses:
W. W. SHULEAN,
W. D. OLESON.